(12) United States Patent
Brown

(10) Patent No.: US 6,773,151 B2
(45) Date of Patent: Aug. 10, 2004

(54) INTEGRATED LAMP HOLDER, REFLECTOR, AND PLUG TERMINAL ARRANGEMENT FOR AUTOMOTIVE LIGHTING APPLICATIONS

(75) Inventor: John Christopher Brown, Murfreesboro, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 100 days.

(21) Appl. No.: 10/139,406

(22) Filed: May 6, 2002

(65) Prior Publication Data

US 2002/0186567 A1 Dec. 12, 2002

Related U.S. Application Data

(60) Provisional application No. 60/289,178, filed on May 7, 2001.

(51) Int. Cl.$^7$ .............................. B60Q 1/00; B60Q 3/00; F21S 8/10; F21V 19/00
(52) U.S. Cl. ....................... 362/519; 362/479; 362/490; 362/493; 362/518; 362/346; 362/347; 362/297
(58) Field of Search ................................ 362/479, 488, 362/490, 493, 516, 518, 519, 546, 341, 346, 347, 297; 445/22

(56) References Cited

U.S. PATENT DOCUMENTS

| | | | |
|---|---|---|---|
| 2,116,324 A | * | 5/1938 | Prance ........................ 362/490 |
| 3,733,461 A | | 5/1973 | Rohats |
| 3,808,496 A | | 4/1974 | McRae |
| 4,276,585 A | | 6/1981 | Deverrewaere |
| 4,364,101 A | | 12/1982 | Brockmeyer |
| 4,835,661 A | | 5/1989 | Fogelberg et al. |
| 4,920,463 A | | 4/1990 | Montet |
| 5,027,262 A | | 6/1991 | Freed |
| 5,357,408 A | * | 10/1994 | Lecznar et al. ............. 362/490 |
| 5,440,456 A | | 8/1995 | Bertling et al. |
| 5,469,341 A | | 11/1995 | Green |
| 5,687,017 A | | 11/1997 | Katoh et al. |
| 5,855,430 A | | 1/1999 | Coushaine et al. |
| 5,868,491 A | | 2/1999 | Moore |
| 5,947,586 A | | 9/1999 | Weber |
| 6,024,469 A | | 2/2000 | Greif |

* cited by examiner

Primary Examiner—Stephen Husar
Assistant Examiner—Sharon Payne
(74) Attorney, Agent, or Firm—Reising, Ethington, Barnes, Kisselle, P.C.

(57) ABSTRACT

An automobile dome lamp assembly which includes a metal reflector unit, plastic lamp housing, cartridge lamp, and cover lens. The reflector unit comprises two concave reflector portions that are mounted on the plastic base in electrical isolation from each other. Each of the two reflector portions include a unitary electrical terminal and lamp retainer clip. The cartridge lamp is mounted to the reflector unit by the two retainer clips such that it is located in front of the reflector. Power supplied to the electrical terminals is routed to the lamp through the reflector portion and their unitary retainer clips. The reflector unit is stamped from a single pieces of metal frangible bridges interconnecting the two reflector portions. The reflector unit can be insert molded to the plastic housing and the frangible bridges are separate at that time to electrically isolate the two reflector portions.

15 Claims, 3 Drawing Sheets

US 6,773,151 B2

INTEGRATED LAMP HOLDER, REFLECTOR, AND PLUG TERMINAL ARRANGEMENT FOR AUTOMOTIVE LIGHTING APPLICATIONS

CROSS-REFERENCE TO RELATED APPLICATION

This application claims the priority of U.S. provisional application No. 60/289,178, filed May 7, 2001, the entire contents of which are hereby incorporated by reference.

TECHNICAL FIELD

This invention relates to lamp assemblies in general and automobile dome lights in particular.

BACKGROUND OF THE INVENTION

Lamp assemblies used for area illumination in automotive interior lighting applications have traditionally been implemented as multi-component assemblies which may include a lamp, lamp housing, cover lens, reflector, lamp holder, electrical contacts, and wiring to conduct power from the connector to the lamp holder where the lamp is mounted. In an effort to reduce cost and complexity of these assemblies, certain of these components are sometimes integrated together; for example, molding the electrical connector as a unitary part of the lamp housing. While perhaps complicating the initial layout and design work for the lamp assemblies, this integration can result in lower overall program cost once the resulting manufacturing and assembly efficiencies are realized.

U.S. Pat. No. 5,947,586 to Weber discloses another such example wherein an injection molded body includes unitary clamp brackets with a metallized surface that routes operating power from blade contacts to the clamp brackets which hold a glow lamp. The metallized surface can also be utilized as a reflector for the lamp. Although this design achieves integration of a number of the above-noted components, it involves a multi-step fabrication process in which an injection-molded conductor molding is formed and then encased in part using a second injection molding step where plastic is coated over the conductor molding in all locations that are not to be metallized. The remaining uncoated surface portions of the conductor molding are then metallized. An alternative fabrication process is disclosed in which no conductor molding is used; rather, the plastic lamp housing is metallized using a semi-additive process in which an electrolytic copper is coated on the housing, a photoresist is then applied which is exposed with a spatial mask (3D mask), the exposed area is developed with the photoresist, and electrolytic copper is then applied and thinned using an etching mask, followed by removal of the photoresist and etching away of the unneeded copper. These fabrication methods can add sufficient complexity and cost to the manufacturing of the lamp assembly that they may erode away any benefit obtained by the reduced part count and simplified final assembly.

It is therefore a general object of the invention to provide a lamp assembly which integrates together various functional components of the assembly while maintaining simplified manufacturing and final assembly of the component parts together.

SUMMARY OF THE INVENTION

In accordance with one aspect of the invention, there is provided a lamp assembly that includes a lamp housing supporting an optical reflector having first and second electrically-conductive reflector portions that are electrically isolated from each other, with the first reflector portion including a first unitary electrical terminal and a first unitary lamp retainer, and the second reflector portion including a second unitary electrical terminal and a second unitary lamp retainer. The first and second unitary lamp retainers can be used to mount a lamp of the type having exposed terminals, such as a cartridge lamp, with one of the lamp terminals being electrically connected to the first unitary lamp retainer and the other of the lamp terminals being electrically connected to the second unitary lamp retainer such that operating current received by the first unitary electrical terminal can flow to the first unitary lamp retainer, then through the lamp to the second unitary lamp retainer and then to the second unitary electrical terminal. The lamp housing can be made from plastic so that the reflector portions can be mounted directly to the lamp housing without creating an electrical short between the reflector portions.

In accordance with another aspect of the invention, the optical reflector can be formed from a unitary piece of stamped metal that includes a central region formed from a pair of curved portions of the stamped metal, with the curved portions being connected by one or more frangible bridges. These frangible bridges can then be separated prior to, during, or after attachment of the curved reflector portions to the lamp housing so that the reflector portions then become electrically isolated from each other. Preferably, the lamp assembly can be manufactured by stamping the connected reflector portions from a single piece of electrically-conductive metal, then attaching the reflector to the lamp housing and separating the reflector portions at the frangible bridges. Preferably, the reflector portions are insert molded into the housing.

BRIEF DESCRIPTION OF THE DRAWINGS

Preferred exemplary embodiments of the invention will hereinafter be described in conjunction with the appended drawings, wherein like designations denote like elements, and wherein.

DESCRIPTION OF THE PREFERRED EMBODIMENTS

Figure 1:
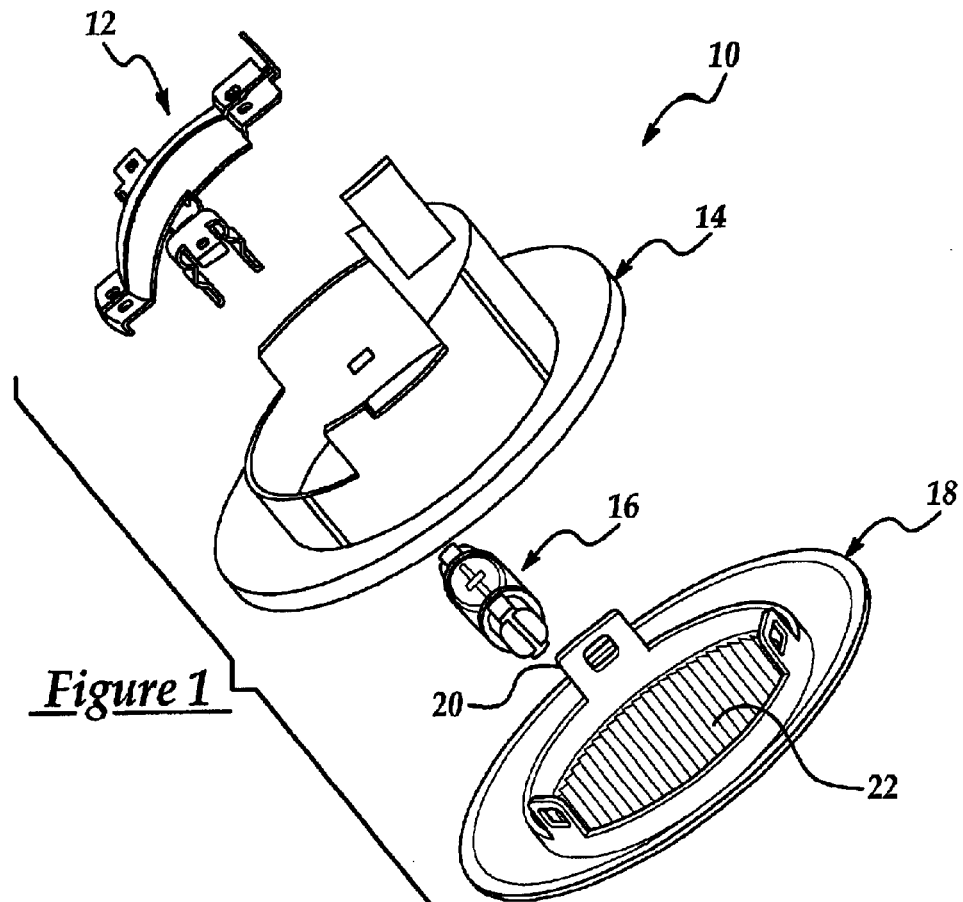
FIG. 1 is an exploded view of a preferred embodiment of an automobile dome lamp constructed in accordance with the present invention.

FIG. 1 is an exploded view of a lamp assembly 10. In the illustrated embodiment, lamp assembly 10 comprises an automobile dome lamp although it will be appreciated as the description proceeds that the invention can be used in a variety of different automotive lighting applications. Dome lamp 10 includes a reflector unit 12, lamp housing 14, light source 16, and cover 18. Reflector unit 12 performs plural functions, including reflection and directing of light emitted from the light source 16, mounting of the light source 16, electrical connection to a standard automotive socket (not shown) for receiving electrical power, and routing of the received power to the light source 16. The reflector unit 12 is mounted to the lamp housing 14 which is a plastic base that can attach in a known fashion to the vehicle headliner or overhead console. The light source 16 can be a cartridge lamp having a cylindrical glass tube with a lamp terminal (end cap) located at each axial end of the lamp for receiving electrical power. A filament is located in a central portion of the glass tube and is connected at each end to one of the lamp terminals. Cover 18 can be a decorative plastic cover that attaches to the lamp housing 14 via tabs 20 and that can be removed to provide access into the lamp housing. The cover 18 can include a light-transmissive lens 22 which can include individual lens elements to shape or otherwise redirect the light into a desired illumination pattern.

Figure 2:
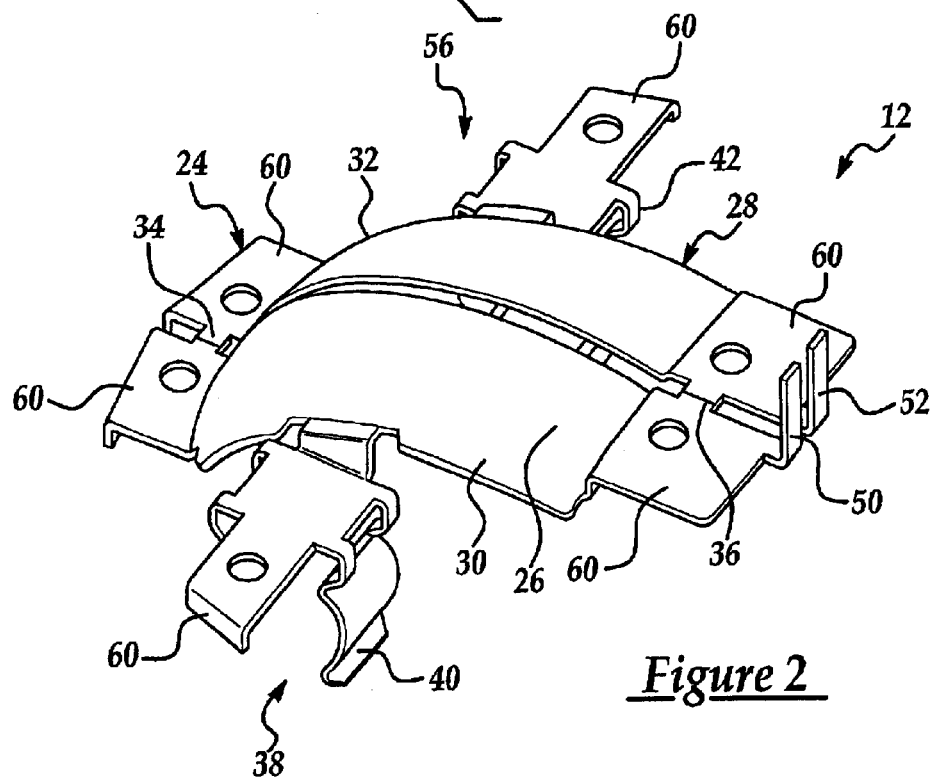
FIG. 2 is an isometric view of the reflector unit shown in FIG. 1.
Figure 3:
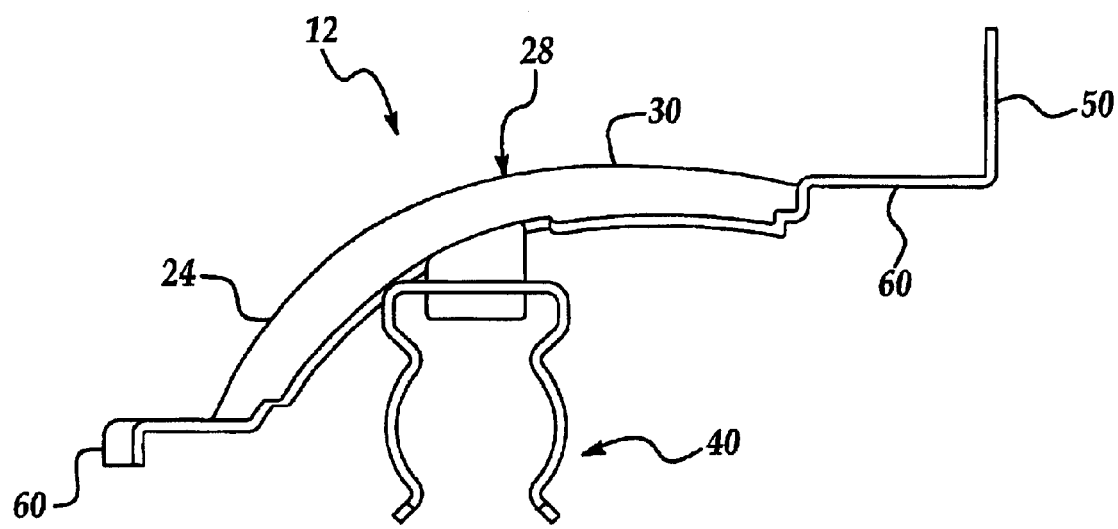
FIG. 3 is a side view of the reflector unit.

Referring now to FIGS. 2 and 3, further details of the construction of the reflector unit 12 will now be provided. The reflector unit can be formed by a stamping operation from a single, unitary piece of electrically-conductive metal 24 such as high reflectivity stainless steel. The metal stamping 24 includes a central region 26 that comprises a concave optical reflector 28 formed from a pair of curved portions 30, 32 of the stamped metal 24. The two curved portions 30, 32 are connected together by a pair of frangible bridges 34, 36 which can be broken during assembly of the reflector unit 12 into the plastic housing so that the two reflector portions 30, 32 can also be used as a part of an electrical circuit that is used to route operating power to the lamp 16. This will be described further below in greater detail.

Reflector unit 12 includes a lamp holder 38 in the form of a pair of spaced lamp retainers 40, 42 which are used to both mount the lamp 16 within the assembly 10 as well as provide operating power to the lamp. In the illustrated embodiment, the lamp retainers 40, 42 are retainer clips into which the cartridge lamp 16 can be snapped. The retainer clips each extend from a different one of the two curved portions 30, 32 of the optical reflector 28. The retainer clips 40, 42 are located at opposite edges of the reflector 28 so that, when the lamp 16 is snapped into place, the central (light emitting) portion of the lamp is positioned in front of the reflector. The reflector has a concave reflective surface (shown in FIG. 5) that can be stamped into whatever shape is necessary to achieve the beam pattern desired.

Figure 6:
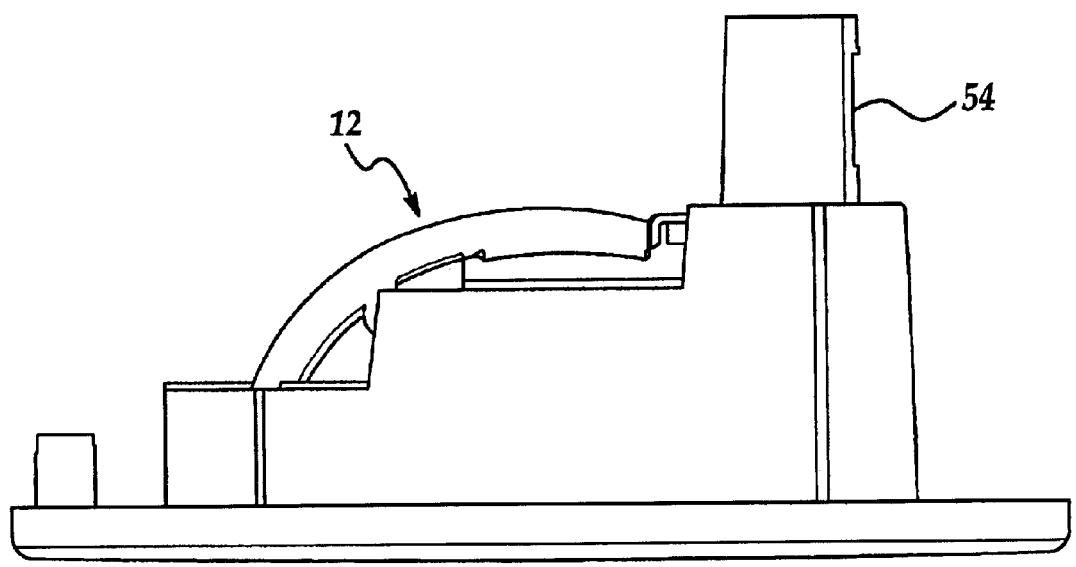
FIG. 6 is a side view.

Reflector unit 12 also includes a pair of electrical terminals 50, 52 each of which extends from a different one of the curved portions 30, 32 of the reflector 28. The terminals 50, 52 are located adjacent each other so that they can be incorporated into a plug connector formed as a unitary part of the lamp housing 14. This connector is shown at 54 in FIGS. 4 and 6 and can be a standard automotive plug connector that receives a socket from a wiring harness (not shown) running through the vehicle headliner.

As will be appreciated, once the frangible bridges 34, 36 are broken, the first curved portion 30 of the optical reflector will still be unitary with its associated retainer clip 40 and electrical terminal 50, but will be electrically isolated from the other curved portion 32 and its associated retainer clip 42 and terminal 52. This allows the two individual terminal / reflector portion / retainer clip pieces to operate as respective positive and negative terminals of an electrical circuit 56 which routes operating current from the first terminal 50 through the reflector portion 30 and to the lamp via the first retainer clip 40 and then back to the power source (e.g., vehicle battery) via the second retainer clip 42, reflector portion 32, and terminal 52. As will be appreciated by those skilled in the art, this provides the advantage that the circuit, input terminals, lamp holder, and optical reflector can all be made from a single piece of metal using one or more stamping operations.

Figure 4:
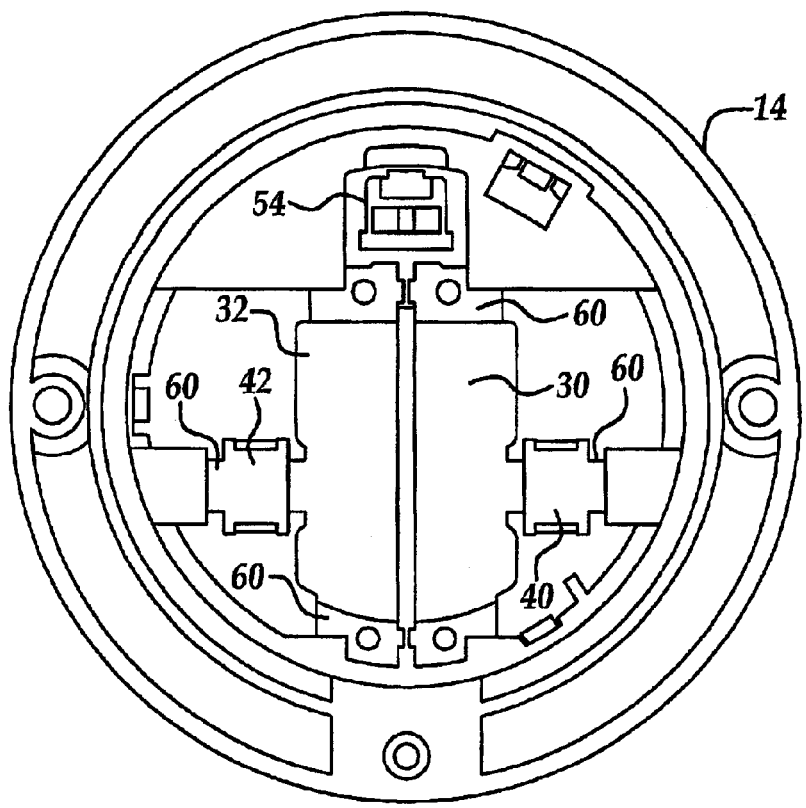
FIG. 4 is a top view of the assembled dome lamp of FIG. 1, excluding the lamp itself.
Figure 5:
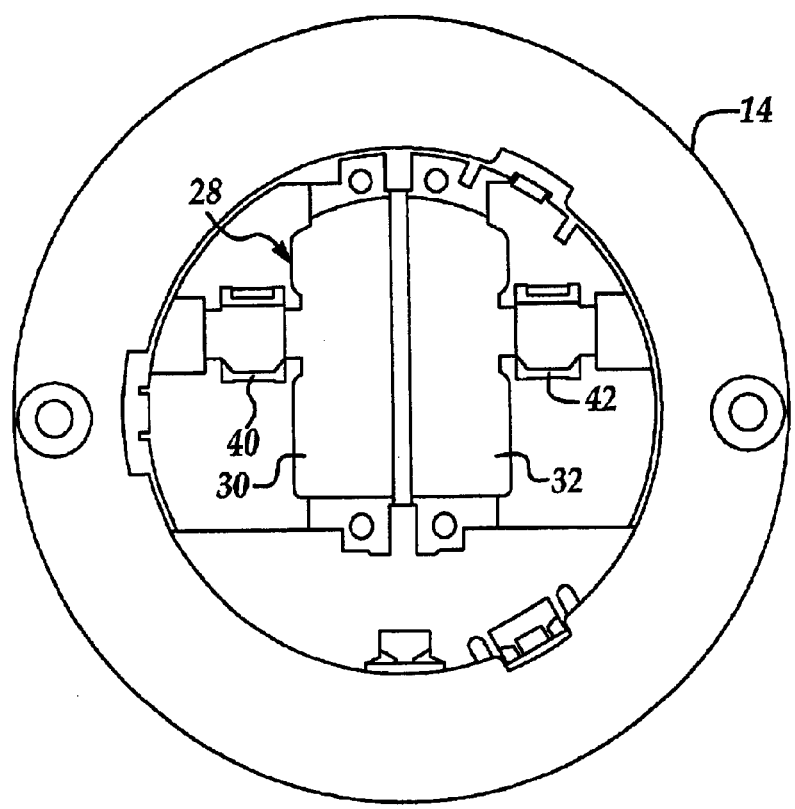
FIG. 5 is a bottom view of the assembled dome lamp.

The reflector unit 12 can be attached to the lamp housing 14 by insert molding the reflector unit during formation of the housing. For this purpose, the reflector unit 12 includes a number of mounting extensions 60 located at various positions about the periphery of the unit. In particular, the mounting extensions are located at each of the two retainer clips 40, 42, and at opposite ends of the reflector 28. The unit 12 can be inserted into the mold with the mounting extensions 60 being molded into the plastic housing during the insert molding process. The resulting configuration is shown in FIGS. 4 and 5. Preferably, the mold is designed to break the frangible bridges 34, 36 during closing of the mold so that the unit can be handled as a single unit when inserted into the mold. Alternatively, the bridges could be punched out after the molding operation in a secondary operation. Furthermore, rather than insert molding, the reflector unit 12 could be heat staked to the lamp housing with the bridges being broken before or after the heat staking operation. Other methods and means for mounting the unit 12 to the lamp housing will become apparent to those skilled in the art.

The connector 54 is preferably made as a unitary part of the lamp housing and is formed during the insert molding operation around the upstanding terminals 50, 52. The metal stamping 24 can be made using normal progressive die stamping operations.

It will thus be apparent that there has been provided in accordance with the present invention a lamp assembly and manufacturing process therefore which achieves the aims and advantages specified herein. It will of course be understood that the foregoing description is of preferred exemplary embodiments of the invention and that the invention is not limited to the specific embodiments shown. Various changes and modifications will become apparent to those skilled in the art and all As such variations and modifications are intended to come within the scope of the appended claims.

What is claimed is:

1. A lamp assembly for use with a lamp having a pair of lamp terminals for receiving operating power, said lamp assembly comprising:

a lamp housing; and an optical reflector mounted to said housing and having first and second eletrically-conductive reflector portions that are eletrically isolated from each other, said first reflector portion comprising a first metal stamping that includes a first unitary electrical terminal that is unitary with the first reflector portion said second reflector portion comprising a second metal stamping that includes a second electrical terminal that is unitary with the second reflector portion, whereby said first and second optical reflector including respective first and second lamp retainers, retainers can be used to mount the lamp with once of the lamp terminals being electrically connected to said first lamp retainer and the other of the lamp terminals being electrically connected to said second lamp retainer such that operating current received by said first unitary electrical terminal call flow to said fist lamp retainer, then through the lamp to the second lamp retainer and then to said second unitary electrical terminal.

2. A lamp assembly as defined in claim 1, wherein said electrical terminals are connected to their associated reflector portions at a location that is spaced from said lamp retainers such that the operating current flows through each of the reflector portions when traveling between the electrical terminal and lamp retainer associated with that reflector portion.

3. A lamp assembly as defined in claim 1, wherein said first and second lamp retainers each comprises a retainer clip.

4. A lamp assembly as defined in claim 3, further comprising the lamp, wherein said lamp comprises a cartridge lamp having opposite ends with one of said lamp terminals located at each of said ends, wherein said cartridge lamp is located in front of said reflector and is supported by said retainer clips with one of said lamp terminals being electrically connected to one of said retainer clips and the other of said lamp terminals being electrically connected to the other of said retainer clips.

5. A lamp assembly as defined in claim 1, wherein said lamp housing includes a connector with said electrical terminals being located within said connector.

6. A lamp assembly as defined in claim 1, further comprising a cover for said lamp housing.

7. A lamp assembly as defined in claim 1, wherein said optical reflector is insert molded within said lamp housing.

8. A lamp assembly as defined in claim 1, wherein said optical reflector is supported in said lamp housing by unitary extensions of said reflector portions and said lamp retainers.

9. A lamp assembly as defined in claim 1, wherein said reflector portions together form a concave reflector surface.

10. A lamp assembly as defined in claim 1, wherein said lamp assembly comprises an automobile dome lamp.

11. A lamp assembly as defined in claim 1, wherein the first and second lamp retainers are unitary with the first and second reflector portions, respectively.

12. A stamping for use in a lamp assembly, comprising a unitary piece of stamped metal that includes:

a central region comprising a reflector formed front a pair of curved portions of said stamped metal, with said curved portions being connected by one or more frangible bridges;

a pair of lamp retainer clips each extending from a different one of said curved portions and being located relative to each other such that a lamp can be retained by said clips with a central portion of the lamp being located in front of said reflector; and a pair of terminals, each extending from a different one of said curved portions.

13. A stamping as defined in claim 12, wherein said terminals are adjacent each other.

14. A stamping as defined in claim 12, wherein said retainer clips are located at opposite edges of said reflector.

15. A stamping as defined in claim 12, wherein said stamped metal comprises electrically-conductive stainless steel.

* * * * *